March 26, 1946. J. F. HOLTJE 2,397,141
GLASS FRAGMENTATION CONTROL
Filed Jan. 30, 1943

Inventor
John F. Holtje
By C. E. Herrstrom & H. E. Thibodeau
Attorneys

Patented Mar. 26, 1946

2,397,141

UNITED STATES PATENT OFFICE 2,397,141

GLASS FRAGMENTATION CONTROL

John F. Holtje, New York, N. Y.

Application January 30, 1943, Serial No. 474,211

3 Claims. (Cl. 154—43)

(Granted under the act of March 3, 1883; as amended April 30, 1928; 370 O. G. 757)

The invention described herein may be manufactured and used by or for the Government for governmental purposes, without the payment to me of any royalty thereon.

The present invention relates to a method and means of controlling the fragmentation of glass, particularly glass window panels, so as to bring to a minimum or negligible minimum the fragmentation, splintering or breaking of glass window panels.

It has been discovered that one of the primary and leading causes of injuries to persons and to property in bombed areas has been due to fragmentation of glass window panels in homes, hospitals and industrial institutions. To this end various means and methods have been proposed and devised to reduce fragmentation of glass to the minimum. One such type of protection is the conventional type of "safety glass" which comprises inserting a sheet of Celluloid like material between two layers of glass. The main objection to this type is the prohibitive cost of replacement of ordinary window plate glass with sections of "safety glass." Another proposed type of protection against shattering is the application of a liquid plastic composition, which, after being applied, dries to form a film which would afford some protection against shattering of the glass. In continued use, it has been discovered that these coatings or films are rapidly affected by the elements, i. e., exposure to rain, heat, and cold which so affected the coating as to cause peeling of the same. Another form of protective glass is that type in which a wire webbing is incased within layers of glass. Experience has proven that this type of glass affords no protection to inhabitants of buildings during bombings or explosions, in fact, glass so constructed shatters and splinters as readily as plain plate glass.

The primary object of the present invention is to provide means for making plate window glass relatively shatterproof and to avoid splintering of the same. Another object is to provide means for holding damaged or splintered glass in place until it can be replaced.

One feature of the invention is that the means provided for rendering plate glass shatterproof herein described will afford permanent protection and will not be subject to the elements.

Another feature of the invention is that in the event there is a near hit by a bomb to a building containing glass windows protected in the manner hereinafter described, the glass may be shattered but will still be contained within the frame. In this manner a temporary protection will be afforded in a building that would be bare of such protection.

In accordance with my invention, I propose to use a clothlike laminated web material, such as buckram, bonded to the surface of plate glass by a transparent substance, that will never fully dry and which, therefore, will penetrate into the pores of the overlaying material without distorting or embrittling it, and which is of an elastic nature to permit some degree of free movement of the overlay when the glass is under distortion from pressure. I also make provision for means to permit pressures to pass through the glass panels without any shattering of the panels.

The invention can best be understood from the following description to be read in view of the accompanying sheet of drawings in which.

Figure 1:
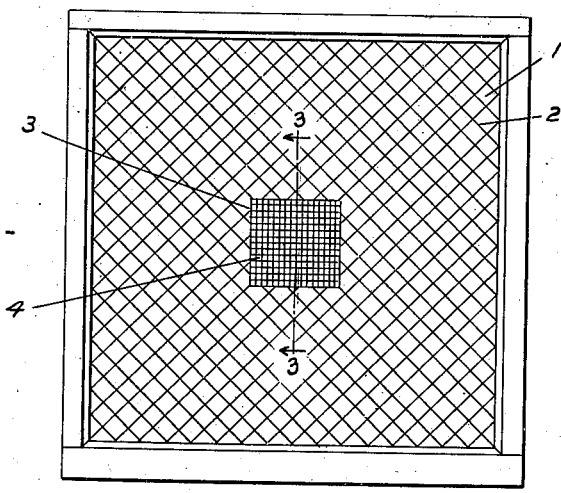
Figure 1 is an elevational view of one embodiment of the invention.
Figure 2:
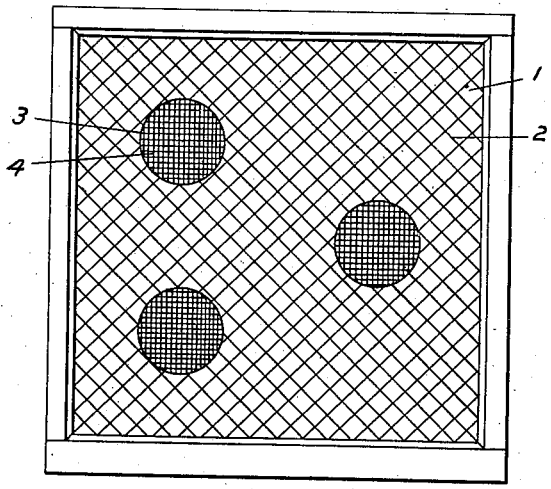
Figure 2 is an elevational view of another embodiment of the invention.
Figure 3:
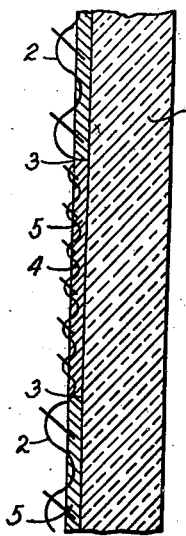
Figure 3 is a cross sectional view taken substantially along the plane of the line 3—3 of Fig. 1.

Referring to the drawing, I indicates a section of plate glass which in the particular example described herein constitutes a panel of a window. A laminated web textile material, such as buckram, designated 2, is bonded to the glass surface by an adhesive, designated 5, that will not form a stiff inflexible reinforcement between the buckram and the glass. To effect such a bond, I propose to utilize an adhesive of the dextrine type which will impart toughness to the web of buckram yet will impart a degree of resiliency. To prevent the dextrine adhesive from drying out prematurely, I propose to add to the adhesive a hygroscopic agent, such as calcium chloride, or like material.

In the application of the laminated web material to the glass surface it is preferred to impregnate the material with the adhesive so that it can be applied to the glass surface by merely moistening the adhesive and rolling it on the glass surface until practically all of the free moisture is removed.

In applying the laminated web material (buckram) to the glass, all the surface is covered except as hereinafter modified. It has been discovered that a sufficient pressure or backdraft caused by an explosion or detonation will tend to force the entire glass panel from the frame in which it is contained. I therefore, provide a break-through area for each buckram reinforcement in the areas or positions of the glass panel which are of lesser resistance than the remainder of the panel. These areas can be determined by test or otherwise. This break-through area or area of lesser resistance is accomplished by causing perforations to be made in a portion of the reinforcement material covering the breakthrough area; or by making an orifice or aperture of various designs and sizes in the laminated web material. The break-through areas, shown at 3 in the drawing are rendered scatterproof by the application of a piece of cotton netting 4 which is adhered to the glass surface by the same means as used in adhering the laminated web material to the glass. In lieu of the cotton netting as a reinforcement means for the breakthrough areas, I have found that materials such as transparent cellulose acetate or ethyl cellulose sheeting can be substituted therefore.

By the utilization of the impregnated material in the manner heretofore described, there is provided means for effectively controlling fragmentation of glass panels. However, if by chance, there should be a destructive force sufficient to shatter numerous windows, the glass will still be retained within the frame thus affording temporary relief against the elements.

While there has been herein described one particular exemplification of the preferred embodiment, it is obvious that substitute materials having similar properties may be utilized for the materials mentioned.

Having thus described the invention, what is claimed as new is:

1. As a new article of manufacture, a glass rendered shatterproof against the explosive blast of bombs, comprising a sheet of glass and a protective overlay applied to one surface of the glass sheet, said overlay being a lamination of web-like, textile reinforcing material, and said web-like lamination being bonded to the said glass surface by a hygroscopic and elastic adhesive to render said overlay permanently flexible, to yieldably cushion the impact of an explosive blast on the glass sheet.

2. As a new article of manufacture, a glass rendered shatterproof against the explosive blast of bombs, comprising a sheet of glass and a protective overlay bonded to one surface of the glass sheet, said overlay being a lamination of web-like, textile reinforcing material, said web-like overlay being disrupted to expose a relatively small area of the said glass surface, and shatterproof material of less resistance than the said web-like reinforcing material applied to the said exposed glass surface to provide a break-through area in the said overlay-bonded glass sheet.

3. In combination with a single sheet of glass, an overlay applied to one surface of the glass to render it shatterproof, said overlay comprising a laminated web-like textile material, and a bonding agent consisting of a hygroscopic and elastic adhesive substance with which the material is impregnated to render the material permanently flexible and sufficiently adhesive to adhere to the surface of the glass sheet, to provide a reinforcement for the glass sheet that will prevent its fragmentation and which will flexibly cushion the force of impacts thereon to reduce the possibility of breakage of the glass.

JOHN F. HOLTJE.